G. O. HODGE.
MOTOR.
APPLICATION FILED MAY 31, 1917.
1,360,637.
Patented Nov. 30, 1920.
5 SHEETS—SHEET 1.
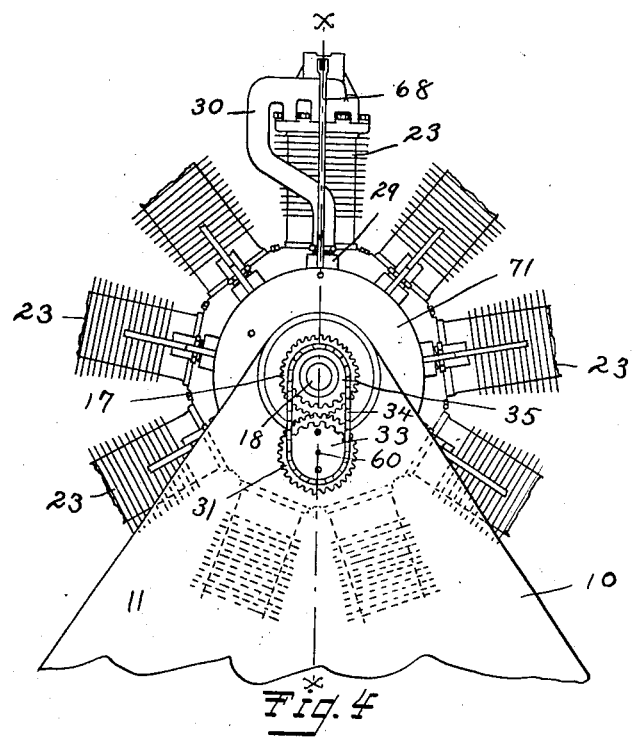
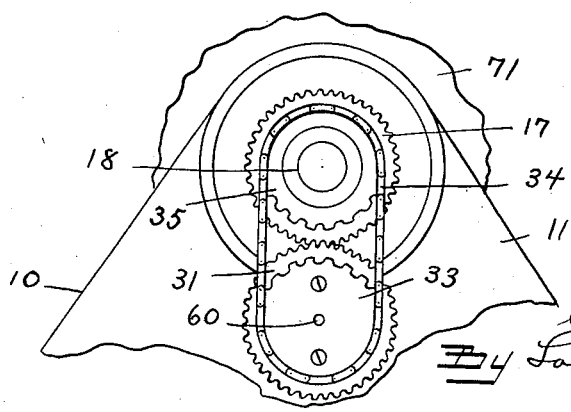
Inventor:
George Orvil Hodge.
By Louis M. Schm. Jr
Atty.

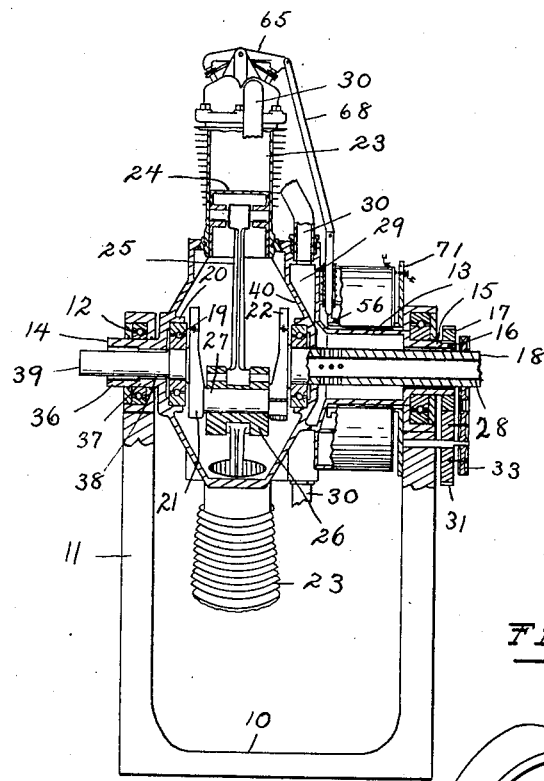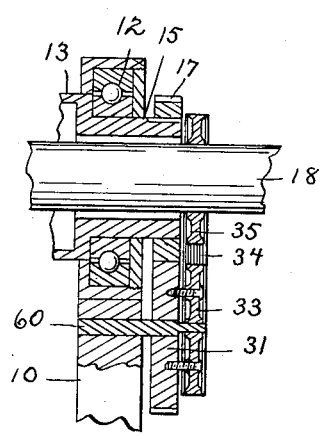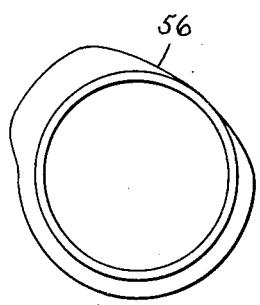

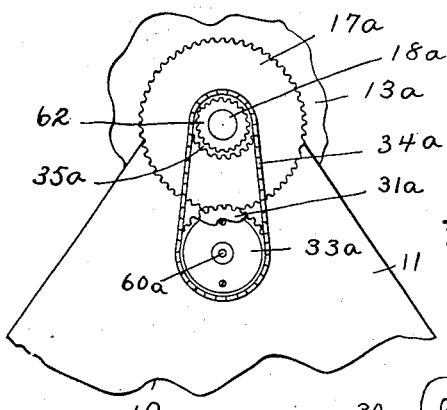
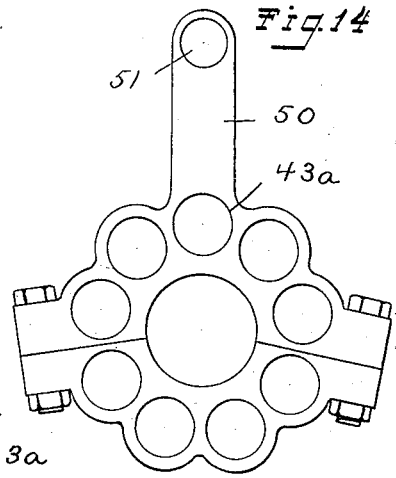
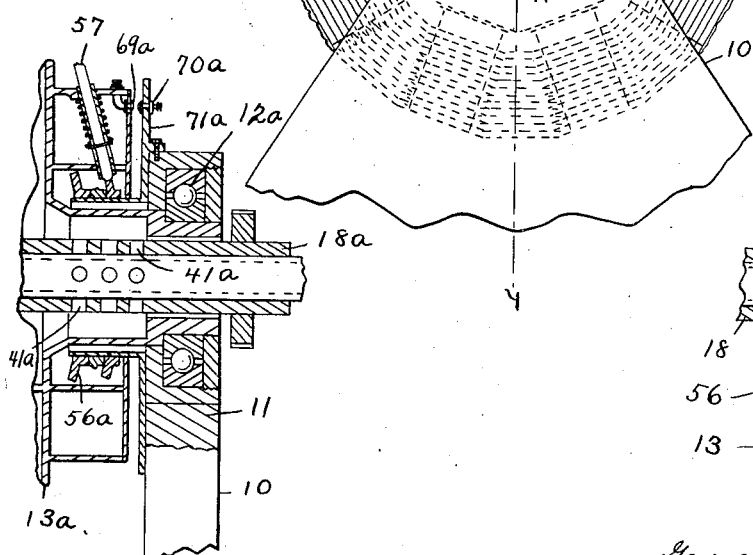
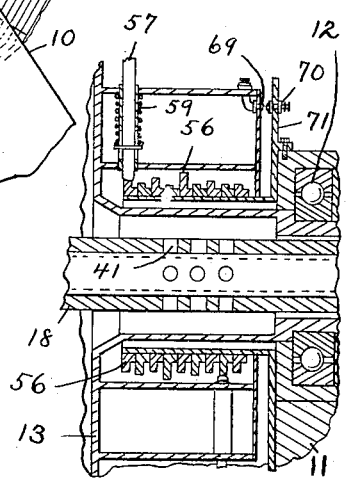

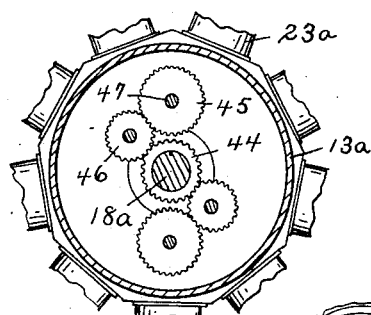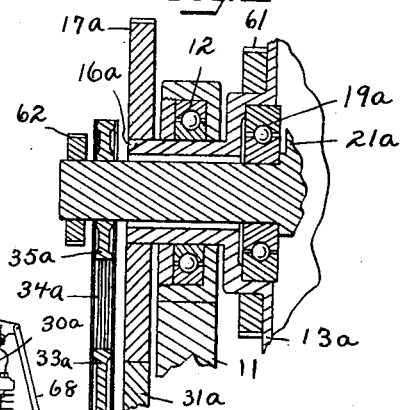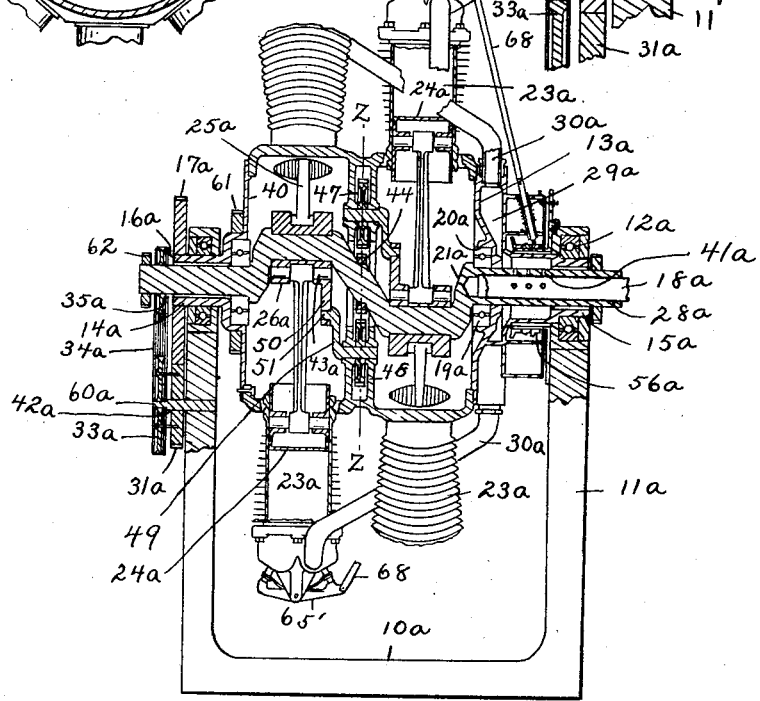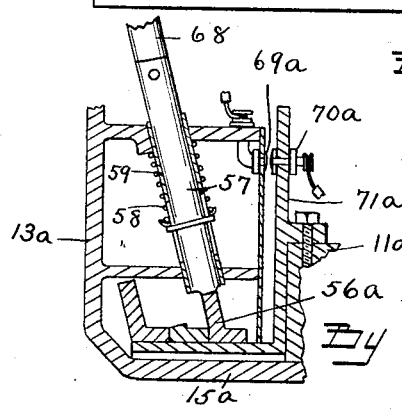

G. O. HODGE.
MOTOR.
APPLICATION FILED MAY 31, 1917.
1,360,637.
Patented Nov. 30, 1920.
5 SHEETS—SHEET 5.
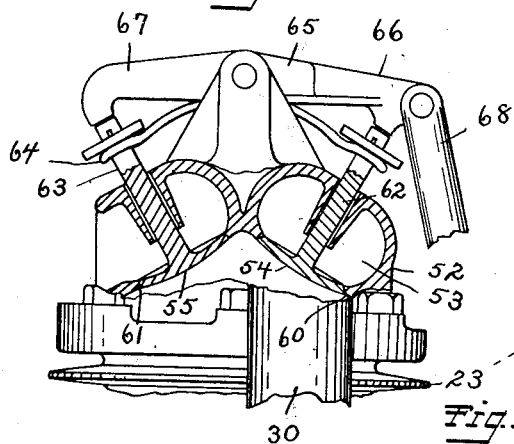
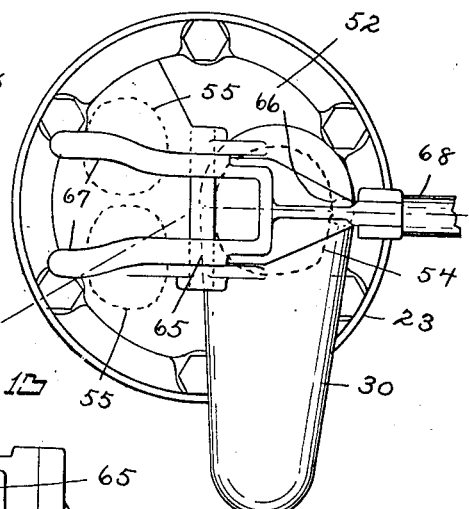
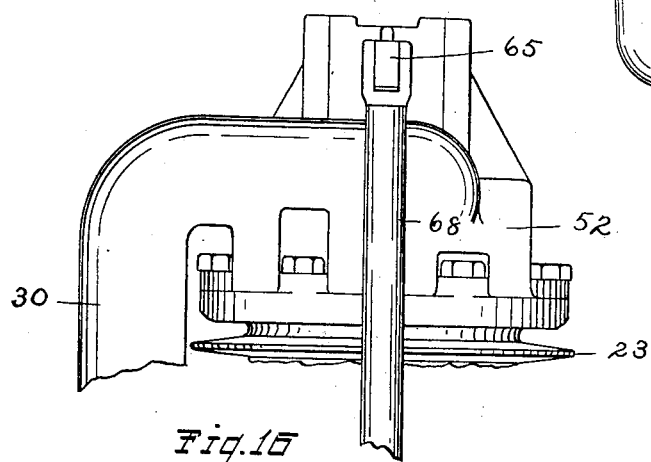
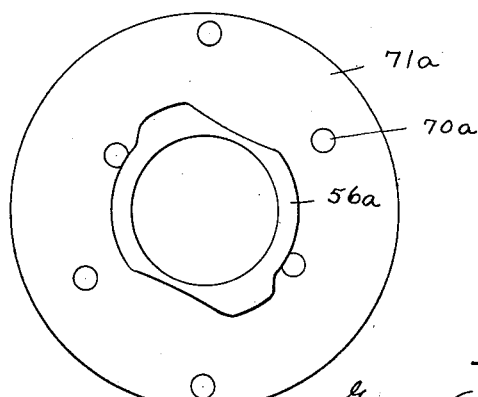
Inventor:
George Orvil Hodge.
By Lauris M. Schmidt
Atty.

UNITED STATES PATENT OFFICE.

GEORGE ORVIL HODGE, OF BRISTOL, CONNECTICUT.

MOTOR.

1,360,637.  Specification of Letters Patent.  Patented Nov. 30, 1920.

Application filed May 31, 1917. Serial No. 171,962.

*To all whom it may concern:*

Be it known that I, GEORGE ORVIL HODGE, a citizen of the United States, residing at Bristol, in the county of Hartford and State of Connecticut, have invented a new and useful Improvement in Motors, of which the following is a specification.

This invention relates to motors. A motor involving the invention is susceptible of advantageous use in widely-different arts. One of the primary motives I have in view is the provision of an appliance of the kind set forth that will have greater power per unit of weight than is at present possible. There are as may be inferred a number of fields in which the motor can with advantage be utilized; as an illustration I might mention an aeroplane. In this particular case the increase in power with respect to weight is a factor of importance. As will be evident the agent for effecting the operation of the motor may be of any desirable nature. I can secure excellent results by the use of a hydrocarbon fluid as gasolene, and when this fluid is utilized, the motor then presents an internal combustion engine.

In the drawings accompanying and forming part of the present specification I have shown in detail one convenient form of embodiment of the invention which to enable those skilled in the art to practice the same will be set forth fully in the following description. Clearly I do not restrict myself to this particular disclosure; I may depart therefrom in several respects within the scope of the invention defined by the claims following said description.

Referring to said drawings:

Figure 1 is an end elevation of part of an engine structure embodying my invention, as applied to an engine having a single row of cylinders.

Fig. 2 is a sectional view on the line $x$ $x$ of Fig. 1.

Fig. 3 is an enlarged view of one end of the structure shown in Fig. 2.

Fig. 4 is an end elevation of the shaft and adjacent parts shown in Fig. 1.

Fig. 5 is an end elevation on the same scale as Fig. 1 of a modification of the engine structure, having a double row of cylinders.

Fig. 6 is a sectional view on the line $y$ $y$ of Fig. 5.

Fig. 7 is a sectional view on the line $z$ $z$ of Fig. 6.

Fig. 8 is an enlarged view of certain parts shown in Fig. 6.

Fig. 9 is a similar view of other parts shown in the same figure.

Fig. 10 is an end elevation of the shaft and adjacent parts shown in Fig. 5.

Fig. 11 is a plan view, on an enlarged scale, of one of the cylinder heads.

Fig. 12 is a side elevation of the same.

Fig. 13 is an end elevation of the same.

Fig. 14 is an end elevation of one of the spools for the connecting rods.

Fig. 15 is an end elevation of one of the cams for the style of engine having the single row of cylinders.

Fig. 16 is a similar view of one of the cams for the double row of cylinders and also of the distributer.

Fig. 17 is a view on an enlarged scale of the cam devices shown in Fig. 2 and the adjacent parts, for the single row of cylinders.

Fig. 18 is a similar view of the cam devices and adjacent parts shown in Fig. 6 for the double row of cylinders.

Like characters refer to like parts throughout the several views.

The preferred embodiment of the invention is the one comprising the use of a plurality (usually two) of rows of cylinders, as in this construction the cranks are so positioned as to obtain a balanced operative condition, whereas with the single row of cylinders a counterweight or equivalent means is preferably provided to effect a balancing of the crank shaft. Both styles of construction, however, involve the main feature of my invention, comprising contrary rotative movements of the cylinders and the cranks, and the structure having the single row of cylinders is shown in the drawing in sufficient detail to illustrate the same.

Referring first to Figs. 1 and 2 a suitable frame as 10 is provided, said frame having a pair of upwardly-directed standards 11, in spaced relation, that serve as the supporting means for the operative structure. At the upper ends of the standards 11 bearings as 12 are provided which act as convenient supports for the sleeve-like ends of the crank case 13. The left end 14 of said crank case projects through its bearing 12 and the extreme end is adapted to be connected in any manner desired for obtaining a power effect. The right end 15 of the crank case 13 projects outwardly through its bearing 12 and has mounted on the extreme outer end portion and keyed thereto a gear as 17.

The crank shaft 18 extends outwardly through the sleeve-like extensions or ends 14 and 15 of the crank case, being operatively supported by bearings as 19 that are themselves sustained in pockets or recesses 20 provided in the interior wall structure of the crank case 13. Thus both the crank case 13 and the crank shaft 18 are rotative. The crank case 13 as shown is a hollow, closed structure, inclosing the crank 21 and its counterweight 22, and has the cylinders 23 mounted radially on the periphery. The pistons 24 are connected by connecting rods as 25 with a spool 26 that is mounted on the crank pin 27.

The right end portion 28 of the crank shaft 18 is hollow, suitably to serve as a fuel inlet and is connected by suitable ports with a fuel chamber 29 that is provided at the right end of the crank case structure, concentric with the shaft 18, and connected by suitable ducts 30 with the cylinders 23.

The mechanism interconnecting the crank case 13 and the shaft 18 operates through the medium of the frame 10, and as shown comprises the following:—As mentioned, the gear 17 is keyed to the crank case 13, being mounted on the right sleeve-like extension 15. The said gear meshes with a gear 31 that is mounted on a stub shaft 60, secured to the frame structure, the same as shown being secured to the right standard 11. The shaft 60 is fixed in position, and incorporated with the gear 31 is a sprocket gear 33, positioned on the outer face thereof. A sprocket chain 34 operatively connects the sprocket gear 33 with a sprocket gear 35, mounted on the shaft 18.

As mentioned the extreme outer end 36 of the left sleeve portion 14 of the crank case is exposed to permit of connecting to the work, the adjacent portion 37 serving as a trunnion, in engagement with the bearing 12, the latter consisting of an approved form of ball-bearing structure. The interior of the sleeve portion 14 is bored out to provide clearance for the left part 38 of the shaft 18, the latter being supported by the bearing 19, which is also a ball-bearing structure, and the extreme end 39 extends beyond the adjacent extreme end 36 of the sleeve portion 14, and like the said end 39 is also adapted to be connected to the work. The right ball-bearing 19 which supports the right part 28 of the shaft 18 is housed within the crank case proper 40, the said right part 28 extending through the fuel chamber 29 and through the bore of the right sleeve portion 15.

As shown there are nine cylinders 23 mounted on the crank case structure 13, the connecting rods 25 for the pistons 24 being all connected in an approved manner with the spool 26, the latter being mounted on the single crank pin 27.

Considering now the gearing mechanism at the right end of the engine structure, it will be noted that the same comprises a suitable unit, that shown being composed of the spur gear 31 and the sprocket gear 33, and coöperating therewith are the two gear members consisting of the spur gear 17 mounted on the crank case structure 13 which meshes with the gear 31 and the sprocket gear 35, operatively connected to the sprocket gear 33 by means of the chain 34, the said sprocket gear 35 being mounted on the shaft 18. Thus the gear mechanism, as described, is adapted for contrary rotative movements of the crank case structure 13 and the shaft 18. In each case the coöperating gears are of the same size in the structure shown, and therefore the rate of movement of each will be the same, relatively to the frame structure, and because the two structures move in contrary directions, the relative or effective rate of movement of the cylinder or crank case structure and the crank shaft structure is double that of either relatively to the frame structure.

Accordingly in the structure shown and described, means are provided with a given actual rotative movement of the cylinders for obtaining an effective rotative movement which is double the said actual rotative movement.

In effecting the result described the gear structure 31 and 33 serves as a tie or key, intermediate the two moving structures.

Figs. 5 to 14 inclusive show a construction of motor involving my invention, that has a double row of cylinders instead of a single row and differs from the organization already referred to in other details as will be now described.

The crank case structure 13$^a$ is provided with sleeve-like extensions at the ends, which serve as the supporting means through the medium of the ball bearing devices 12$^a$, comprising the sleeve 14$^a$ at the left and the sleeve 15$^a$ at the right, the bearings 12$^a$ being supported at the upper ends of the standards 11$^a$ of the frame 10$^a$. The crank shaft 18$^a$ is positioned concentric with the sleeves 14$^a$ and 15$^a$, and extends through the same and projects beyond the ends thereof, being mounted in ball bearing devices 19$^a$ housed in pockets 20$^a$ in the interior of the end portions of the crank case structure 13$^a$. The cranks 21$^a$ are housed within the crank case structure 13$^a$ and are positioned at opposite sides of the crank shaft 18$^a$.

The inner ends of the cylinders 23$^a$ open into the interior of the body portion of the crank case structure 13$^a$. There are nine cylinders 23ᵃ in each row, spaced at equal intervals, and the cylinders of one row are positioned respectively angularly midway between the cylinders of the other row. The crank case structure 13ᵃ comprises the body portion 40 at the left end portion that serves as the crank case proper for housing the cranks and connected parts and at the right end is provided with the separate chamber 29ᵃ, concentric with the axis, that serves as a fuel chamber.

The crank shaft 18ᵃ is generally of tubular form to reduce weight and the right end portion 28ᵃ serves as the fuel inlet, the portion within the fuel chamber 29ᵃ having radial ports 41ᵃ through the side wall, for connecting the hollow interior with the said fuel chamber 29ᵃ.

The gearing for interconnecting the crank case structure 13ᵃ with the crank shaft 18ᵃ is positioned at the left and comprises as shown the gear 17ᵃ keyed to the portion 16ᵃ of the left sleeve 14ᵃ outside the left standard 11ᵃ. Said gear 17ᵃ meshes with the gear 31ᵃ which is part of the gear member 42ᵃ mounted on the shaft 60ᵃ, secured to the said standard 11ᵃ, the said gears 17ᵃ and 31ᵃ thus serving as a connecting means for the crank case structure. For the crank shaft there is the sprocket part of the gear member 42ᵃ in the form of the sprocket wheel or gear 33ᵃ connected by means of the sprocket chain 34ᵃ with the sprocket gear 35ᵃ, secured to the shaft 18ᵃ. As to the details of the gearing, the gears 17ᵃ and 31ᵃ are of two to one ratio and the sprocket gear 33ᵃ is one and one-half times the size of the sprocket gear 35ᵃ. Thus the conditions of rotative movement provided comprise a ratio of one to one for the crank case structure, relatively to the frame, with the movement in one direction, and a ratio of three to one for the crank shaft and frame, with the movement of the crank shaft in the reverse direction to that of the crank case structure, resulting in an effective relative turning movement of the crank case structure and the crank shaft of four to one. Between the left sleeve 14ᵃ and the body portion 40 of the crank case structure is mounted a gear 61 to be connected to the work and on the end 39ᵃ of the shaft 18ᵃ that extends outwardly beyond the sleeve 14ᵃ is a gear 62 also adapted to be connected to the work.

The pistons 24ᵃ are connected by means of the connecting rods 25ᵃ with the spools 26ᵃ, mounted on the respective crank pins, there being one spool 26ᵃ for each set of cylinders and pistons. Each spool 26ᵃ is provided with a set of nine bearing pins 43ᵃ which serve as the coupling means for the connecting rods 25ᵃ, all the said rods being connected in a similar manner.

As a means for connecting the spools 26ᵃ so as to coöperate with the shaft and crank I provide indirect means in the form of compensating mechanism that operates to produce a parallel motion effect, whereby as one result a uniform condition of operation is obtained for the different pistons and which comprises the following:

The said mechanism is duplex, being similar for the two sets of cylinders, and is operated from the single gear 44 suitably rigidly mounted as by keying onto the crank shaft 18ᵃ, and positioned between the two cranks 21ᵃ. A double radial wall structure 48 is provided for housing the gear 44 and other gearing for coöperating therewith and comprises a gear 45 positioned to one side and of the same size as the gear 44 and operatively connected therewith by means of an idler gear 46. The shaft 47 for the outer gear 45 projects through the wall structure 48 on the side of the spool 26ᵃ with which it is to coöperate and has keyed thereto a crank arm 49 that is positioned radially adjacent one end of the spool 26ᵃ. The said spool 26ᵃ has a fixed radial arm 50 operatively connected to the end of the crank arm 49 by means of the pin 51. The idler 46 serves to give the proper direction of movement and the parts are so proportioned that as the crank case structure and crank shaft are rotated under normal conditions of usage there will be parallelism of movement of the line extending through the centers of the crank pin 27ᵃ and pin 51 and the line extending through the centers of the gears 47 and 44, the center of the latter corresponding to the center of the crank shaft 18ᵃ.

Supply-fuel ducts as 30ᵃ lead from the fuel chamber 29ᵃ to the cylinders 23ᵃ, terminating at the outer ends in the outer ends of the cylinder heads 52 in the valve chamber 53 in which is positioned the inlet valve 54. For the exhaust I provide a pair of similar valves 55, also housed in the cylinder head 52. The operation of the valves is controlled by valve mechanism in coöperation with a set of stationary cam devices 56ᵃ mounted on the right sleeve 15ᵃ, and positioned on the inner side of the right standard 11ᵃ. A rod 57 makes contact by its lower end with the outer, bearing edge of the particular cam 56ᵃ with which it coöperates, being held in contact therewith by the spring 58 and guided by the sleeve 59. The seat 60 for the inlet valve 54 and the seats 61 for the two exhaust valves 55 are inclined, so that the valve stems that extend through the said seats and extend outwardly suitably to be engaged by the valve operating mechanism, are also inclined, being divergent relatively to the axis. The stem 62 for the inlet valve 54 is on one side of the axis and the stems 63 for the exhaust valves 55 being on the other side thereof. A single spring 64 of steel wire is operatively connected to the valve stems 62 and 63 and tends to hold the same in the closed position. A bent and forked rocker arm 65 fulcrumed at the middle portion on the top of the cylinder head 52 engages by its one single arm 66 with the stem 62 of the inlet valve 54 and by the two arms 67 of the fork engages with the stems 63 of the exhaust valves 55. A link 68 connects the rocker arm 65 with the contact rod 57.

The details for the proper operation of the valves for the different cylinders differ appreciably for the single row and double row of cylinders. For the single row of cylinders there are nine cams 56, one for each cylinder, and for the firing there is a plug 69 for each cylinder that revolves with the same that coöperates with a plug 70, mounted on the distributer 71, the latter being stationary.

For the double row of cylinders, the cylinders 23$^a$ are arranged in groups of three, and a set of three cams 56$^a$ serves to operate the valves for all of the cylinders, eighteen in all. The individual revolving plugs 69$^a$ for the cylinders 23$^a$ are positioned to coöperate with a special arrangement of stationary plugs 70$^a$ on the distributer 71$^a$ as follows: The stationary plugs 70$^a$ are arranged in pairs, there being three of such pairs, the plugs of each pair being on opposite sides of the axis and equidistant from the axis, and the radial distance from the axis for the plugs of the different pairs being different, whereby there is effected a proper selection of the cylinders for firing.

The cam devices and the firing devices combine to effect the following result: Numbering the eighteen cylinders consecutively, each cylinder will be fired twice in each revolution and the grouping for firing is as follows: The stationary plugs 70$^a$ for one group will fire cylinders 1, 4, 7, 10, 13 and 16; the next operative set of plugs 70$^a$ will fire cylinders 2, 5, 8, 11, 14 and 17; and the remaining pair of plugs 70$^a$ will fire cylinders 3, 6, 9, 12, 15 and 18.

The engine described operates on the four cycle principle, and notwithstanding this fact, it will be noted that by reason of the rotation of the crank shaft, the operation is effected so far as involves the valve mechanism by means of cam devices that are fixed and stationary. Furthermore with the double row of cylinders the said cam devices are reduced to a minimum, comprising as shown, simply three individual cams, each operating the valves for a group of cylinders. The feature mentioned indicates one of the advantages of the construction having the double row of cylinders, and there are other advantages of this construction such as the superior balanced effect mentioned.

The compensating mechanism described for the connecting rod spools serves to produce a uniform operative effect for all of the cylinders and is therefore desirable from a practicable operative standpoint. This feature, however, is not necessary, as the engine is operative with other arrangements for the spool, without the compensating feature. One method of doing this is to have one connecting rod fixedly connected to the spool, the others being pivotally connected thereto. With this arrangement there will be lack or uniformity of operation of the different cylinders.

It will be clear that the appliance of which certain embodiments have been set forth fully involves broad relations and is susceptible of various uses. I have mentioned particularly the aerial field. The motor may be employed with equal advantage in other connections, for instance on a ship.

As has been mentioned, the preferred embodiment of my invention is the form shown in Figs. 5 to 14 inclusive, and one of the reasons for this preference is the relative simplicity of the cam arrangement for operatively controlling the valve movements. Another advantage is the double firing for each revolution of the cylinders.

By the relative location of the cylinders provided for each cylinder in one row there is a cylinder in the other row that is positioned directly on the opposite side of the shaft, and the construction and arrangement are such that in all cases two such opposed cylinders are fired simultaneously, thus effecting a desirable balanced operative result.

The detail of using a single rod for effecting the movements of both the inlet and discharge valves permits of the use of a single cam for each cylinder considered individually or each cylinder group.

Being operated on the four cycle principle, an odd number of cylinders is necessary for efficient operation and in order to obtain balanced mechanical operation a uniform distribution about the axis of a plurality of cylinders is necessary. Because of these conditions, the set of cylinders made up of the minimum number for practicable operation consists of three, positioned at 120 degree intervals.

Such an arrangement requires the use of three cams.

The balanced explosive effect would be obtainable with two sets or rows of cylinders made up of three in a row, with the cylinders in staggered relation, and without changing the cams.

Increased power is obtained by increasing the number of cylinders in each set or row, and this is effected, without a change in the cams, in exponential multiples of three, as 9 and 27.

By using eighteen cylinders arranged in two sets or rows as described an effectively balanced operative result is obtainable.

What I claim is:

1. An internal-combustion engine of four cycle form comprising a set of cylinders and a shaft rotative in opposite directions, the cylinders being arranged in two rows, with an equal number in the two rows and an odd number in each row, and the two rows disposed angularly so that each individual cylinder in one of the said rows on one side of the axis is mechanically balanced by a cylinder in the other row that is on the opposite side of the axis, and firing means provided for effecting the firing simultaneously, under operating conditions, of such opposed cylinders in pairs and also for effecting the firing of all of the cylinders two times during each revolution.

2. The combination of a crank case and a shaft having adjacent concentric and oppositely rotating parts, a set of cylinders mounted on the periphery of the said crank case, and pistons operating in the said cylinders, a crank on the said shaft having a crank pin, a spool mounted on the said crank pin, and having a set of bearing pins, connecting rods connecting the said pistons with the said bearing pins, and compensating mechanism serving to position the said spool on the crank pin, and the said compensating mechanism comprising an arm extending radially from the said spool and gearing operatively connecting the said arm with the said shaft.

3. The combination of a crank case and a shaft having adjacent concentric and oppositely rotating parts, a set of cylinders mounted on the periphery of the said crank case and pistons operating in the said cylinders, a crank on the said shaft having a crank pin, a spool mounted on the said crank pin, and having a set of bearing pins, connecting rods connecting the said pistons with the said bearing pins, and compensating mechanism serving to position the said spool on the crank pin, the said compensating mechanism comprising a gear keyed to the said shaft, a second gear, supported by the crank case and provided with a crank, an intermediate gear connecting the said gears, and an arm on the said spool connected to the said crank.

4. An internal-combustion engine as described in claim 1, and the said odd number for the cylinders in each row being a multiple of sets of three, the cylinders of each set being spaced by 120 degree intervals.

5. An internal-combustion engine as described in claim 4 and having three cams for effecting the control of the valve mechanism, whereby one of the said cams may be operative for each of the cylinders of such a set of three.

6. An internal-combustion engine as described in claim 5 and having gearing interconnecting the said cylinder and shaft so that as the cylinders make one revolution in one direction the shaft makes three revolutions in the opposite direction.

7. An internal-combustion engine of four cycle form comprising a fixed frame structure and devices operatively supported by the said frame structure comprising a cylinder structure for rotating in one direction and a shaft structure for rotating in the opposite direction, gearing interconnecting the said frame structure, cylinder structure, and shaft structure, cam devices for controlling the operation of the said cylinders, the said gearing serving to provide an operative relation of one revolution of the cylinder structure in one direction to three revolutions of the shaft structure in the opposite direction, the said cylinder structure comprising a plurality of sets of three cylinders for each set, the said cam structure comprising three cams only for all of the cylinders, and the said cam structure being fixedly secured to the said frame structure.

8. An internal-combustion engine as described in claim 7, the said cylinder structure comprising two rows of cylinders, with nine cylinders in each of the said rows.

GEORGE ORVIL HODGE.

Witnesses:
 HENRY JOWICKI,
 GEO. A. STARK.